Nov. 13, 1962     C. VAN DER LELY ETAL     3,063,724
DEVICES FOR SPREADING GRANULAR OR POWDERY MATERIAL
Filed Oct. 21, 1959     3 Sheets-Sheet 1

Nov. 13, 1962     C. VAN DER LELY ETAL     3,063,724
DEVICES FOR SPREADING GRANULAR OR POWDERY MATERIAL
Filed Oct. 21, 1959     3 Sheets-Sheet 2

INVENTORS
Cornelis van der Lely
and Ary van der Lely
BY
Mason, Mason & Albright
Attys.

Nov. 13, 1962 C. VAN DER LELY ETAL 3,063,724
DEVICES FOR SPREADING GRANULAR OR POWDERY MATERIAL
Filed Oct. 21, 1959 3 Sheets-Sheet 3
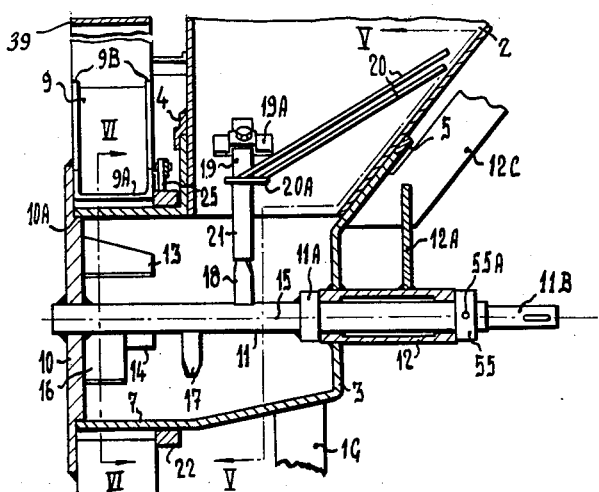
FIG. 4
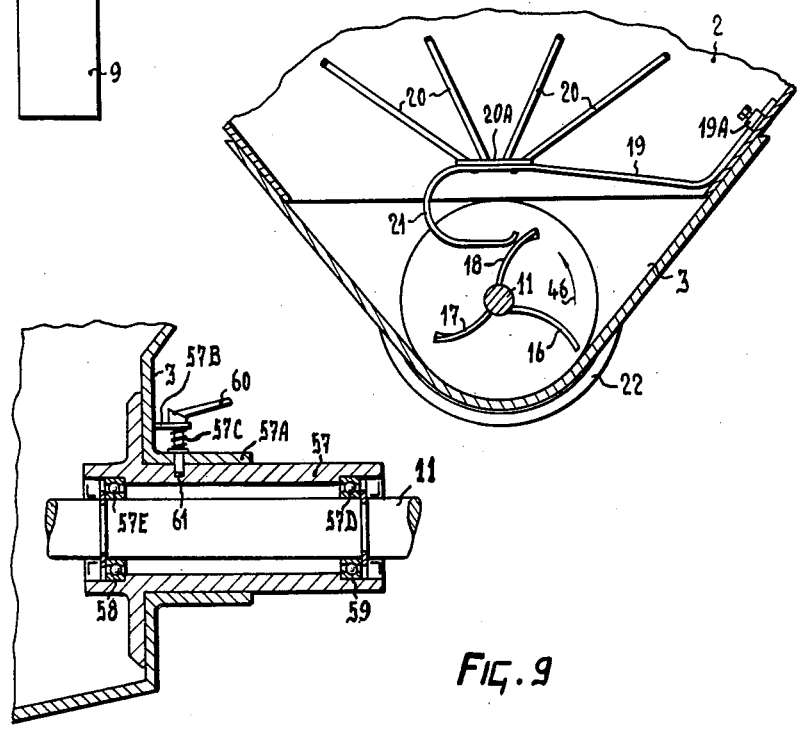
FIG. 5
FIG. 9
INVENTOR.
Cornelis van der Lely
and Ary van der Lely
BY
Mason, Mason v Albright
attys.

United States Patent Office 3,063,724
Patented Nov. 13, 1962

3,063,724
DEVICES FOR SPREADING GRANULAR OR POWDERY MATERIAL
Cornelis van der Lely, Zug, Switzerland, and Ary van der Lely, Maasland, Netherlands, assignors to C. van der Lely N.V., Maasland, Netherlands, a Dutch limited company of the Netherlands
Filed Oct. 21, 1959, Ser. No. 847,845
Claims priority, application Netherlands Nov. 3, 1958
20 Claims. (Cl. 275—8)

This invention relates to devices for spreading granular or powdery material, of the kind comprising a container for the material to be spread, rotary ejecting means consisting of a plurality of centrifugally-acting ejector blades arranged for rotation about a substantially horizontal axis whereby the material can be spread by being thrown from the outer ends of said blades, and a frame for carrying said container and said ejecting means, said frame being adapted to be propelled over the ground on which the material is to be spread.

It is an object of the invention to provide a device of the kind set forth, which will be effective in spreading material uniformly, and which is simple in construction.

In accordance with the invention, there is provided a device of the kind set forth, wherein said container has a portion which lies within the inner ends of said blades and which is adapted to discharge material directly to said inner ends.

By thus feeding the material in the container directly to the inner ends of the centrifugally-acting blades, the necessity for feeding mechanism arranged to withdraw material from the container and to feed it to the inner ends of the blades, no longer arises and the construction is much simplified.

Figure 1:
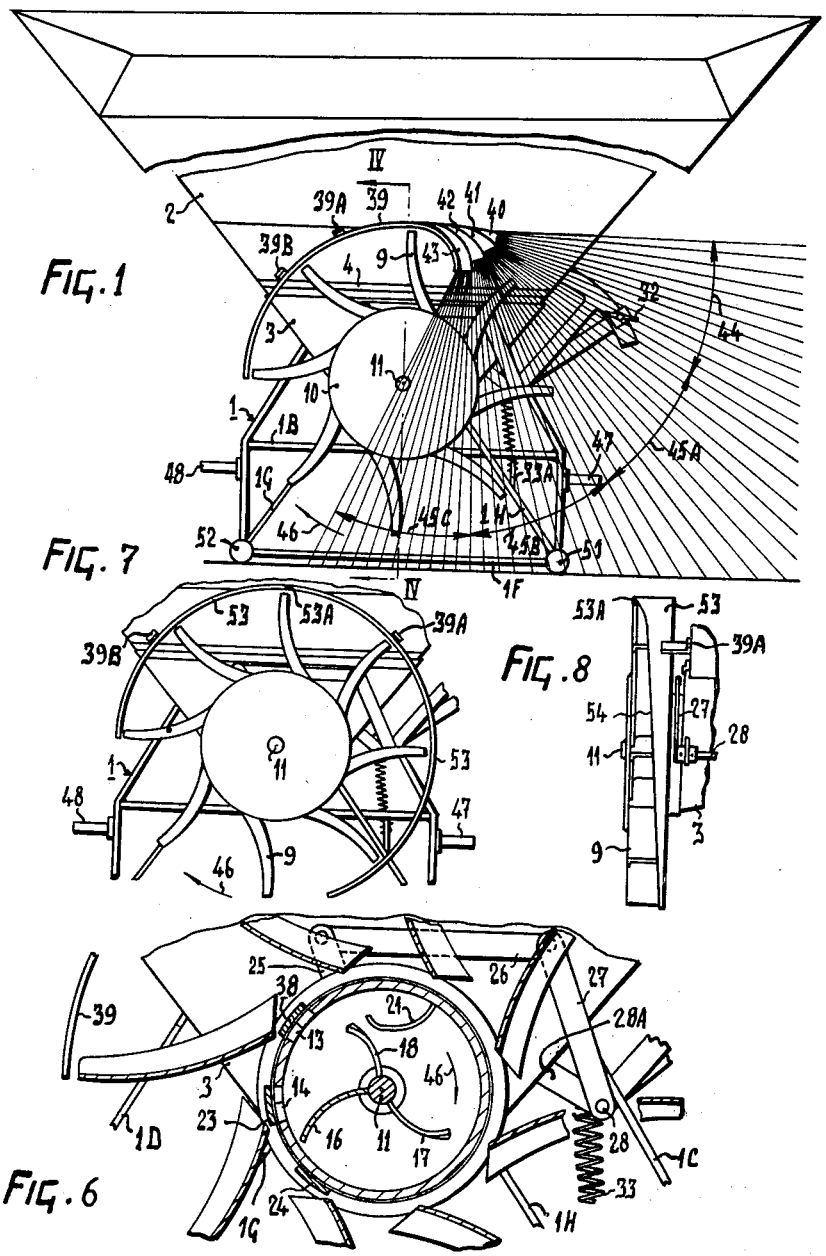
Figure 2:
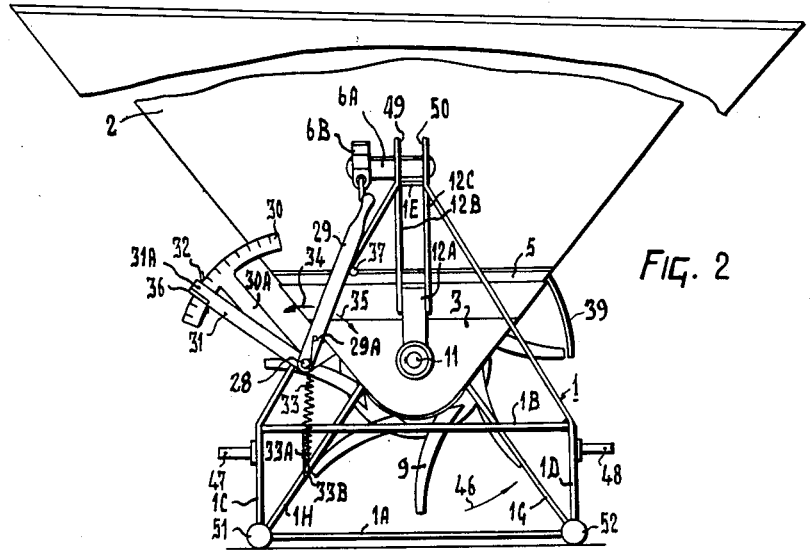
Figure 3:
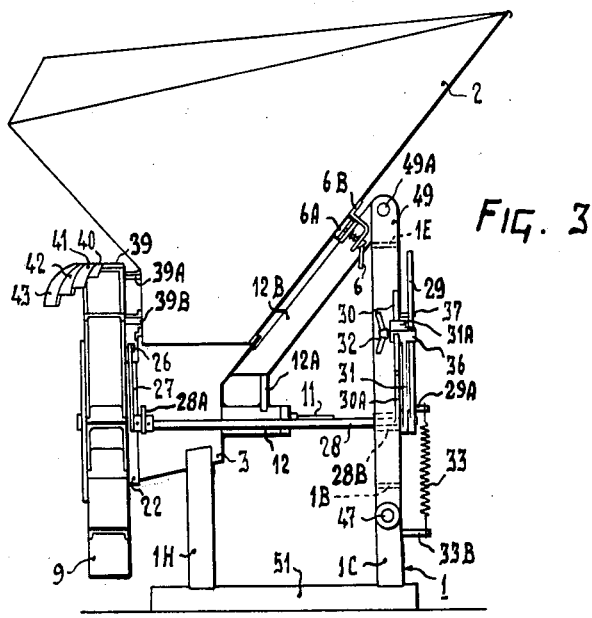

For a better understanding of the invention and to show how the same may be carried into effect, reference will now be made by way of example to the accompanying drawings in which:

FIGURE 1 is a rear elevation of a device for spreading granular or powdery material in accordance with the invention, FIGURE 2 is a front elevation corresponding to FIGURE 1, FIGURE 3 is a side view of the same device, FIGURE 4 is a part-sectional view taken on the line IV—IV of FIGURE 1 but to an enlarged scale, FIGURE 5 is a sectional view taken on the line V—V of FIGURE 4, FIGURE 6 is a section taken on the line VI—VI of FIGURE 4, FIGURE 7 is a view similar to FIGURE 1 but showing a modified detail, FIGURE 8 is a side view corresponding to FIGURE 7, and FIGURE 9 is a sectional view of a modified detail of the device shown in FIGURE 4.

Referring first to FIGURES 1 to 6 of the drawings, there is shown a device for spreading granular or powdery material which includes a frame generally indicated at 1. In a manner which will be explained, the frame rigidly supports the lower, trough-like, part 3 of a container for the material to be spread. The container has an upper part 2 which is made removable from the part 3 and which constitutes an extension of the side walls of the lower part 3. The illustrated device is intended to be mounted upon the three-point power hoist of a tractor. In FIGURES 1, 2 and 3 the device is shown resting upon the ground and not mounted on the tractor power hoist. The base of the frame is constituted by a pair of parallel runners 51 and 52. At the front ends of the runners 51 and 52 there is a framework (see FIG. 2) comprising horizontal frame members 1A and 1B and upright frame members 1C and 1D. Above the level of the frame member 1B, the upright frame members 1C and 1D converge towards one another to a location where they are joined by a short frame element 1E. Above the frame element 1E, the frame members 1C and 1D are prolonged by parallel portions 48 and 49, these portions together with the element 1E constituting a U-shaped bracket. The portions 48 and 49 are formed with holes which are aligned, one of such holes being indicated at 49A in FIGURE 3. The U-shaped bracket is adapted to receive the upper link of the three-point hoist of a tractor, such link being held in the bracket with the aid of a pin (not shown) which is entered in the aligned holes in the bracket. Pins 47 and 48 are arranged to project from the lower parts of the frame members 1C and 1D, these pins being intended to receive the ends of the two lower lift links of the tractor power hoist.

At the rear end of the runners 51 and 52, there is a framework consisting of a horizontal frame member 1F (see FIGURE 1) and two upwardly converging frame members 1G and 1H. As can be seen best from FIGURES 2 and 3, the upper ends of the frame members 1H and 1G are secured to the exterior of the fixed container part 3. The front end of the latter has fixedly mounted therein a sleeve 12, to the exterior of which there is secured an upstanding plate 12A. There are two further frame members 12B and 12C, which are at their lower ends secured to the front side of the container part 3. As will be seen from FGIURE 3, the frame members 12B and 12C incline forwardly from their places of attachment to the container part 3, the upper ends of these frame members being joined to the portions 49 and 50 which constitute the previously described U-shaped bracket. The plate 12A is entered betwen the frame members 12B and 12C and is fixed thereto. Hence the sleeve 12 is supported in two places along its length.

As previously indicated, the upper part 2 of the container is removaly attached to the lower part 3 thereof. As seen best in FIGURE 4, the front and rear walls of the upper part 2 extend within the corresponding walls of the lower container part 3. A bar 5 is secured on the exterior of the front wall of the upper part 2, the bar abutting against the upper edge of the corresponding wall of the lower container part 3. The rear wall of the upper part 2 has a recessed strip 4 attached thereto, this strip likewise abutting the corresponding upper edge of the wall of the lower part, and moreover engaging over the side of such edge. It will be appreciated that the upper part 2 can be withdrawn from the lower part 3 of the container, simply by lifting the upper part 2 therefrom. To prevent unintentional withdrawal of the upper container part 2, a releasable locking means is provided. Such locking means can be seen in FIGURES 2 and 3 and it will be noted that the frame members 12B and 12C have a finger 6A secured thereto and extending laterally therefrom. A bracket 6B is fixed to the front wall of the upper container part 2, the bracket having mounted therein a pin 6. A spring is associated with the pin and tends to urge the same to a position where it enters a hole formed in the finger 6A. The pin 6 can be manually displaced against the action of the spring so as to withdraw the pin from the hole in the finger 6A. With the pin in the withdrawn position, the upper container part can be removed, but so long as the pin is entered in the hole in the finger such part is locked in position.

The lower container part 3, as seen best from FIGURE 4, is of trough-like form at its forward end, the mouth of the trough being defined by upwardly extending walls which are further upwardly extended by the upper container part 2. The part 3 has a rearward cylindrical extension 7, the axis 15 of which is horizontal and coincident with the axis of the sleeve 12. A shaft 11 is mounted for rotation in the sleeve 12, the latter constituting a journal bearing. The shaft has a fixed collar 11A and a removable collar 55 held in position by a pin 55A. The forward end 11B of the shaft is adapted for directly connecting to the power take-off shaft of a tractor. The rear end of the shaft 11 has a disc 10 secured thereto. The disc 10 is formed with an annular shoulder 10A which fits in the otherwise open mouth of the cylindrical portion 7. Beyond the shoulder 10A, the disc 10 is of reduced thickness, and has secured to it a plurality of ejector blades 9. Each such blade 9 is made from channel section material. In FIGURE 4 the web 9A of one of the blades 9 can be seen as also the two side flanges 9B of the channel section. The disc 10 is intended to be turned with the aid of the shaft 11 in the direction indicated by the arrow 46 in FIGURE 1. It will be noted that each of the ejector blades is non-radial with respect to the axis 15 so that the outer end or tip of a blade lags behind the inner end or root thereof. The blades are, however, bent forwardly with respect to their intended direction of motion. The root ends of all the blades are located so as to sweep over the curved external surface of the cylindrical portion 7. The width of each blade, as measured in a direction parallel to the axis about which they rotate, is about one-tenth (or more) of the diameter of the path swept by the tips of the blades. There are two apertures 13 and 14 formed in the portion 7 (see FIGURES 4 and 6), the extent of each aperture in a direction axially of the shaft 11, being about equal to the width of the ejector blades at their root ends. A ring 22 is mounted upon the cylindrical portion 7 so as to be adjustably turnable thereon. The ring carries three curved shutter plates 23, 24 and 38. These plates extend into the annular cavity between the exterior of the cylindrical portion 7 and the root ends of the series of ejector blades 9. Each of these plates is such that it can be brought into register completely with one of the apertures 13 or 14 whereby the aperture is closed. The relative spacing of the apertures 23, 24 and 38 is such that when the plate 23 closes the aperture 14, then the other aperture 13 is similarly closed by the plate 38. When on the other hand the plate 23 closes the aperture 13, then the other plate 24 closes the aperture 14. An arm 25 extends from the ring 22 and is connected with a link 26. The latter is connected with one end of a lever 27 fast upon a shaft 28. The shaft 28 is supported for rotary movement by an arm 28A extending from the container part 3 near the rear end thereof. The shaft 28 is supported also in a bearing 28B (see FIGURE 3) carried by the frame member 1C. The shaft extends to the front end of the device and has a hand-lever 29 fixed thereon.

The frame member 1B has a depending finger 33A secured thereto, such finger being best seen in FIGURE 1. The lower end of the finger 33A carries a pin 33B on which one end of a spring 33 is anchored. The other end of the spring is anchored to a pin 29A fixed to the lever 29. In the position of the lever 29 shown in FIGURE 2, it will be realised that the line of action of the spring 33 is to the right-hand side of the shaft 28 and hence the spring tends to turn the lever 29 in the direction shown by the arrow 35. The lever 29 is limited in its movement in the direction 35 by a pin 37 carried by the frame member 1C. The hand-lever 29 can be moved manually in the direction illustrated by the arrow 34 in FIGURE 2. Initially the movement away from the pin 37 will be resisted by the spring 33 until the line of action thereof reaches a dead-center position where it overlies the axis of the shaft 28. Thereafter further movement in the direction 34 will be assisted by the spring 33. Movement of the lever 29 in the direction 34 is however limited by an abutment 36. The latter is formed integral with a bifurcated head 31A formed at one end of an arm 31 which is also pivotally mounted on the shaft 28.

The bifurcated head 31A embraces an arcuate strip 30 which is rigidly supported by an arm 30A fixed to the frame member 1C. A wing-screw 32 is entered in one cheek of the bifurcated head 31A, and by tightening such wing-screw the head 31A may be clamped in various positions along the fixed arcuate strip 30. The latter is graduated so as to allow the head 31A to be set at predetermined locations in relation to the strip 30.

The relative angular positioning of the lever 29 and the ring 22 in regard to the shaft 28, is such that when the lever 29 occupies the position shown in FIGURE 2, the shutter plates 23 and 38 of the ring 22 are located in their positions shown in FIGURE 6 where they register with and completely close the apertures 13 and 14. If now the lever 29 is moved in the direction 34 until it comes to rest against the abutment 36, then the ring 22 moves, due to the movement of the shaft 28 and the inter-connecting linkage, in a direction such that the shutter plate 23 moves away from the aperture 14 and begins to co-operate with the aperture 13, the shutter plate 24 moving towards the aperture 14 and beginning to co-operate therewith. Depending upon the setting of the head 31A, and therefore the setting of the abutment 36 carried thereby, so the shutter plates 23 and 24 will more or less close the apertures 13 and 14 with which they co-operate.

The shaft 11, in addition to carrying the ejecting device consisting of the disc 10 and the ejector blades 9 peripherally mounted thereon, carries three blades 16, 17 and 18 (see FIGURES 4 and 6). The blades are spaced axially along the shaft 11, and the blades 17 and 18 are shaped in such a way that when the shaft 11 turns in the intended direction shown by the arrow 46 in FIGURE 6, the material encountered by these blades is not only stirred but is also urged in directions axially of the shaft 11 and towards the apertures 13 and 14. The blade 16 is located at the region of the apertures 13 and 14 and serves to ensure that material is discharged through these apertures. As will be apparent from FIGURES 4 and 5, when the shaft 11 turns, the blade 18 will encounter the downwardly depending end 21 of a leaf spring 19. The latter is clamped to the internal side wall of the upper container part 2 by means of a staple 19A fixed to the container portion 2. A set-screw entered in the staple holds the leaf spring 19 in the desired position. The leaf spring has a plate 20A secured thereon, such plate fixedly supporting the lower ends of a series of elongated fingers 20. From the plate 20A the fingers extend upwardly and divergently within the container, and when the shaft 11 is rotating and the blade 18 encountering the end 21 of the leaf spring 19, the fingers move and act as agitators which prevent undesired caking of the material within the container. During the movement of the fingers they contact the inner wall of the container.

As can best be seen from FIGURES 1 and 3, an arcuate baffle plate 39 is mounted on brackets 39A and 39B fixed to the upper container part 2. The baffle plate 39 is of a width substantially equal to the width of the tips of the blades 9, the width of the baffle being somewhat less than one-fifth of the diameter of the path swept by the tips of the blades during the movement of the latter about the axis of the shaft 11. The length of the baffle plate is such that it lies over the tips of the ejector blades 9 for about 90° of their movement about the axis of the shaft 11. At about the region where an ejector blade will leave the baffle (i.e., the uppermost point reached by the tip of the blade during its travel), the baffle is formed with a series of inwardly turned deflectors 40, 41, 42 and 43. The deflectors commencing with the deflector 40 are progressively turned inwardly to a greater extent. As appears best from FIGURE 3, they are also progressively directed to a greater extent away from the path followed by the tips of the ejector blades.

In the employment of the device described above, the device may be mounted upon the three-point power hoist of a tractor. For this purpose, the pins 47 and 48 are connected to the ends of the two lower lift links of the power hoist, and the end of the upper link is secured in the U-bracket 49, 50 and 1E. The end 11B of the shaft 11 is now directly connected to the power take-off shaft of the tractor. The material for spreading is loaded into the container 2, 3. At this time the hand-lever 29 is in the position where it abuts the stop 37 so that the shutter plates 23 and 38 close the apertures 13 and 14 in the manner shown in FIGURE 6. The device may be appropriately raised with the tractor hoist and taken to the site where it is desired to spread the material held in the container thereof. With the aid of the tractor power take-off shaft, the shaft 11 may now be set in rotation in the direction shown by the arrow 46. The hand-lever 29 is now moved away from the stop 37 and allowed to encounter the abutment 36 which has been fixed in some desired position in relation to the arcuate strip 30. This brings the shutter plates 23 and 24 into co-operation respectively with the apertures 13 and 14 in such a way that the latter are left either wholly uncovered or covered to a chosen extent. The material in the container can now pass out of the cylindrical mouth portion 7 via the apertures 13 and 14 therein which constitute gated outlet ports. The root ends of the ejector blades now sweep over the outlet ports and receive material therefrom. Under the action of centrifugal force, the material moves towards the tips of the ejector blades and is thrown against and intercepted by the interior of the arcuate baffle 39 which is of a width equal to that of the tips of the blades. The material is discharged from the end of the baffle 39 and from the continuation of the deflecting surface thereof constituted by the deflectors 40 to 43. In FIGURE 1 the material being spread is indicated by a series of radiating lines. In a region indicated at 44, the material is flowing from the end of the baffle plate 39 and from the first deflector 40. In the region 45A, the material is flowing from the deflector 41, whilst in the regions 45B and 45C the material is flowing from the deflectors 42 and 43.

It will be noted that in the regions 45B and 45C the material is being directed downwardly to a location just behind the device itself. The material will, however, be mainly spread laterally so that it is deposited substantially to the right (as seen in FIGURE 1) of the vertical plane passing through the axis of the shaft 11. It will be appreciated that the direction of travel of the device during its use, will be substantially axially of the shaft 11. The power take-off shaft of a tractor normally extends also in this same direction so that coupling of the shaft 11 to the power take-off shaft is a simple matter which does not call for intermediate transmission elements as would be the case if the ejecting device turned about a substantially vertical axis so that the shaft 11 would be vertical rather than horizontal.

When the device is operating and spreading material over, for example, a field, it will usually be the case that the tractor has to be turned at the end of the field. During this turning it is not necessarily desirable to spread the material. It is an easy matter for the driver of the tractor to move the hand-lever 29 back to the position shown in FIGURE 2 during the turning of the tractor. This will temporarily close the outlet ports in the cylindrical mouth of the container. When the hand-lever is restored to the position where it lies against the abutment 36, then assuming that the position of the abutment has not been adjusted, the hand-lever 29 will be returned to the same position where the ports are open to the same extent.

As will be apparent from FIGURE 4, if it is desired to remove the ejecting device which includes the blades 9, this may be simply done by removing the collar 55 whereupon the shaft 11 can be bodily withdrawn together with the disc 10. In FIGURE 4 the shaft 11 is carried in the simple journal bearing constituted by the sleeve 12. If so desired a ball bearing mounting can be employed for the shaft 11. This modification is illustrated in FIGURE 9. The sleeve 12 is now replaced by a sleeve 57 which is entered in a cylindrical mouth portion 57A formed in the front wall of the container part 3. A bracket 57B supports a pin 60 which is urged by a spring 57C through an appropriately positioned hole in the portion 57A. The pin can be brought into register and engagement with a hole 61 formed in the sleeve 57. A ball bearing 57E, 57D is mounted at either end of the sleeve 57 and carries the shaft 11. It will be understood that when the pin 60 is withdrawn against the action of the spring 57C, the shaft 11 may be drawn out in the same way as before, but in this case the sleeve 57 will remain upon the shaft together with the ball bearings.

The baffle 39 and the deflectors 40 to 43 formed therewith, may be replaced by another deflecting baffle. The shape of this deflecting baffle is seen in FIGURES 7 and 8. The deflecting baffle consists of an arcuate strip 53 supported like the strip 39 with brackets 39A and 39B, but extending over about two-thirds of the circular path swept by the tips of the ejector blades. The left-hand portion of the strip (as seen in FIGURE 7) is the same as the baffle 39 and extends fully over the width of the tips of the blades 9, but from the point 53A to the right, the edge 54 of the strip is cut back along a helical path, the axis of the helix being centered on the axis of the shaft 11. In FIGURE 8 the deflecting baffle will be seen to taper downwardly although overlying the tips of the ejector blades 9. This tapered deflecting baffle will ensure that the material is distributed in much the same manner as indicated in FIGURE 1. In the case of the baffle 39 and the baffle 53, the positioning in relation to the ejector blades may be made adjustable, to vary the spread of material.

Although it is advantageous to drive the shaft 11 from the power take-off of the tractor, it will be understood that this shaft could be arranged to be driven from any other source of power. It will furthermore be appreciated that the device could have a frame supported on ground wheels so that the device could be towed behind a tractor or other vehicle not possessing a power hoist.

What we claim is:

1. A device for spreading granular or powdery material comprising a container for said material, the lower part of said container being trough-like extending laterally, at least one discharge aperture in the lower part of said container for the discharge of material therefrom, a material spreader, a plurality of ejector blades included in said spreader and extending outside of the container and further extending outwardly with respect to the axis of said spreader, said ejector blades including roots and ends and being channeled longitudinally, the roots of said blades being disposed around a portion of said lower container part which includes said discharge aperture.

2. A device as claimed in claim 1, wherein the axis of the lower part of said container extends in a vertical plane lying in the travelling direction of the device.

3. A device as claimed in claim 2, wherein the lower part of said container has an opening in a side, said opening coinciding in a plane perpendicular to the aforesaid axis of the lower part of said container, a shaft extending through the lower part of said container substantially along the aforesaid axis for the lower part of said container, said spreading member being connected to the end of said shaft, said end of said shaft extending to said opening and the other end through a further opening in the lower part of said container for connection to power means.

4. A device as claimed in claim 3, wherein said material spreader comprises a disc connected to said shaft, the aforesaid ejector blades being connected to the circumference of said disc, said disc abutting the periphery of the aforesaid opening coinciding with a plane perpendicular to the axis of the lower part of said container.

5. A device as claimed in claim 3, wherein said shaft extending through the lower part of said container has a plurality of blades extending outwardly from said shaft within said container for urging material from the container to the lower part of said container.

6. A device as claimed in claim 3, wherein a further blade is attached to said shaft, said further blade extending outwardly from said shaft towards the discharge aperture, said further blade being curved backwardly from the said shaft relative to the direction of rotation of said shaft.

7. A device as claimed in claim 1, wherein the width of the discharge aperture is substantially equal to the width of the ejector blade.

8. A device as claimed in claim 1, wherein the width of the ejector blades as measured in a direction parallel to the axis about which said blades rotate is more than one tenth of the diameter of the path swept by the outer ends of said blades.

9. A device for spreading granular or powdery material comprising a container for said material, the lower part of said container being trough-like with an axis, a plurality of discharge apertures in the lower part of said container for the discharge of material therefrom, an ejector means with a plurality of ejector blades including roots and ends and being channeled longitudinally, the roots of said ejector blades being disposed around a portion of the lower part of said container which includes said discharge apertures whereby material may move from said apertures to said ejector blades, and a deflector disposed partially around and above the ends of said ejector blades, said deflector being adapted to direct material discharged from said ejector blades both laterally and downwardly.

10. A device for spreading granular or powdery material comprising an upper container part for said material, said upper container part having an opening at its top for loading material and another opening at its bottom for discharge of material, a lower container part, said lower container part receiving the discharge opening from the bottom of said upper container part, said lower container part being trough-like with an axis lying in a plane parallel to the travelling direction of the device, a plurality of discharge apertures disposed along a side of said lower container part, ejector means with a plurality of ejector blades, the roots of said ejector blades being disposed around a portion of said lower container part which includes said apertures.

11. A device for spreading granular or powdery material comprising a container for said material, the lower part of said container being trough-like with a substantially horizontal axis, an opening in a side of the lower part of said container, said opening coinciding with a plane perpendicular to the aforesaid horizontal axis for the lower part of said container, at least one discharge aperture in the lower part of said container for the discharge of material therefrom, a revolvable shaft extending through the lower part of said container substantially along the aforesaid horizontal axis for the lower part of said container, said shaft having one of its ends extending to said opening and the other end through a further opening in the lower part of said container for connection to power means, bearing means for said shaft connected to said container, a plurality of blades carried on said shaft for urging material in the lower part of said container toward said discharge aperture, a plurality of ejector blades interconnected to said shaft outside of said container and extending outwardly with respect to said shaft, said ejector blades including roots and ends and being channeled longitudinally, the roots of said blades being disposed around a portion of said lower container part which includes said discharge aperture, and a deflector, said deflector being disposed partially around and above the ends of said ejector blades and adapted to direct material being discharged from said device both laterally and downwardly.

12. A device for spreading granular or powdery material comprising a container for said material, the lower part of said container being trough-like with a substantially horizontal axis, an opening in a side of the lower part of said container coinciding with a plane perpendicular to the aforesaid horizontal axis, a plurality of discharge apertures in the lower part of said container for the discharge of material therefrom, a revolvable shaft extending through the lower part of said container substantially along the aforesaid horizontal axis for the lower part of said container, said shaft having one of its ends extending to said opening and the other end through a further opening in the lower part of said container for connection to power means, bearing means for said shaft connected to said container and providing support for said shaft, a plurality of blades attached to and extending outwardly from said shaft for urging material in the lower part of said container toward said discharge apertures, a plurality of ejector blades interconnected to said shaft outside of said container and extending outwardly from said shaft, said ejector blades including roots and ends and being channeled longitudinally, the roots of said ejector blades being disposed around a portion of the lower part of said container which includes said discharge apertures whereby material may move from said apertures to said ejector blades, shutter means for said apertures, said shutter means being disposed between said ejector blades and said apertures, control means for said shutter means adapted to control selectively the quantity of material discharged from said apertures, and a deflector disposed partially around and above the ends of said ejector blades, said deflector being adapted to direct material discharged from said ejector blades both laterally and downwardly.

13. A device for spreading granular or powdery material comprising a container for said material having a trough-like lower part with a substantially horizontal axis, an opening in the side of the lower part of said container, said opening being in a plane perpendicular to the aforesaid horizontal axis for the lower part of said container, at least one discharge aperture in the lower part of said container for the discharge of material therefrom, a revolvable shaft extending through the lower part of said container along the aforesaid horizontal axis for the lower part of said container, said shaft having one of its ends extending to said opening and its other end extending through a further opening in the lower part of said container for connection to power means, supporting means for said shaft interconnected to said container, a plurality of blades carried on said shaft adapted to urge material in the lower part of said container toward said discharge aperture, a plurality of ejector blades interconnected to said shaft outside of said container and extending outwardly with respect to said shaft, said ejector blades including roots and ends and being channeled longitudinally, the roots of said blades being disposed around a portion of said lower part of said container which includes said discharge apertures, a deflector, said deflector disposed partially around and above the ends of said ejector blades, said deflector being at least the same width as the ends of said ejector blades, an inner portion of said deflector being disposed so as to direct the discharge of material laterally from said inner portion, and an outer portion of said deflector being so disposed so as to direct a discharge downwardly from said deflector.

14. A device for spreading granular or powdery material comprising a container for said material, the lower part of said container being trough-like with a substantially horizontal axis, an opening in the lower side of said container, said opening being in a plane perpendicular to the aforesaid axis for the lower part of said container, at least one discharge aperture in the lower part of said container for the discharge of material therefrom, a revolvable shaft extending through the lower part of said container along the aforesaid axis, said shaft having one of its ends extending to said opening and the other of its ends extending through a further opening in the opposite part of said container for connection to power means, supporting means for said shaft connected to said container, a plurality of blades carried on said shaft adapted to urge material in the lower part of said container toward said discharge aperture, a plurality of ejector blades interconnected to said shaft outside of said container and extending outwardly with respect to said shaft, said ejector blades including roots and ends and being channeled longitudinally, the roots of said blades being disposed around a portion of the lower part of said container which includes said discharge aperture, an agitator part, said agitator part comprising a leaf spring secured to the inside of said container on one end, a part attached to said leaf spring which encounters one of said blades when said shaft is rotated causing said spring to move, and fingers attached to said spring and extending upwardly in said container to agitate material therein when said spring moves, and a deflector disposed partially around and above the ends of said ejector blades and adapted to indirect material discharged from said blades both laterally and downwardly.

15. In a device for spreading granular or powdery material having ejector means which discharge material delivered from apertures proximate thereto, a shutter means disposed near said apertures, control means for said shutter means adapted to control selectively the discharge of material from said apertures, said control means comprising shutter plates adapted to cover said apertures, a rotatable ring which carries said shutter plates, linkage means for rotating said ring with said shutter plates to control variably the discharge opening of said apertures, said linkage means including a spring loaded hand lever and means to limit the movement of said lever whereby when said lever is moved in one direction said apertures are closed and when it is moved in the other direction said apertures are opened.

16. A device for spreading granular or powdery material having a container for said material, and ejector means for discharging said material, said container having one or more discharge apertures to discharge material to said ejector means, a shutter means disposed near said apertures, control means for said shutter means adapted to control the discharge of material from said apertures, said shutter means comprising a number of shutter plates, the number of which is one larger than the number of outlet apertures, linkage means for moving said shutter plates along said apertures, in the open position of said apertures one of said shutter plates lying at a distance from said apertures, in the closed position of said apertures said one shutter plate closing one of said apertures.

17. In a device for spreading granular or powdery material having a vertically disposed ejector part with channeled blades which discharge material forced from apertures proximate thereto by centrifugal force, a shutter means disposed between said ejector blades and said apertures, control means for said shutter means adapted to control selectively the discharge of material from said apertures, said control means comprising shutter plates adapted to cover said apertures, a rotatable ring which carries said shutter plates, linkage means for rotating said ring with said shutter plates to control variably the discharge opening of said apertures, said linkage means including a spring loaded hand lever and means to limit the movement of said lever whereby when said lever is moved in one direction said apertures are closed and when it is moved in the other direction said apertures are opened.

18. In a device for spreading granular or powdery material having a vertically disposed ejector disc and ejector blades extending therefrom, a deflecting baffle for material ejected from said ejector blades comprising one or more arcurate strips, the innermost of said strips extending substantially ninety degrees from one side of said ejector blades to above said ejector blades and then tangentially therefrom whereby material discharged from said ejector blades will be directed laterally from said strip, the succeeding of said strips being adjacent to the innermost strip and to each other and progressively turned outwardly and backwardly to an increasingly greater extent whereby the outermost strip will direct material ejected from the ejector blades downwardly and laterally of the ejector disc.

19. In a device for spreading granular or powdery material having a vertically disposed ejector disc and ejector blades extending therefrom, a deflecting baffle for material ejected from said ejector blades comprising a plurality of arcuate strips, the innermost of said strips extending substantially ninety degrees from one side of said ejector blades to above said ejector blades and then tangentially therefrom whereby material discharged from said ejector blades will be directed laterally from said strip, the succeeding of said strips being adjacent to the innermost strip and to each other and progressively turned outwardly and backwardly to an increasingly greater extent whereby the outermost strip will direct material ejected from the ejector blades downwardly and backwardly with respect to said device.

20. In a device for spreading granular or powdery material having a revolving shaft for an ejector disc disposed within an associated material container and at least one outwardly extending blade secured to said shaft, an agitator part comprising a leaf spring secured to said device, a connecting portion attached to said leaf spring, said portion encountering said blade when said shaft is rotated thereby causing said leaf spring to vibrate, and fingers attached to said leaf spring, said fingers extending upwardly to agitate material in said device when said spring is vibrated by the action of said rotating blade.

References Cited in the file of this patent

UNITED STATES PATENTS

| 85,379 | Going | Dec. 29, 1868 |
|---|---|---|
| 2,701,595 | Berger | Feb. 8, 1955 |

FOREIGN PATENTS

| 1,011,190 | France | Apr. 2, 1952 |
|---|---|---|
| 597,224 | Great Britain | Jan. 21, 1948 |
| 659,940 | Great Britain | Oct. 31, 1951 |
| 511,678 | Italy | Jan. 27, 1955 |